United States Patent [19]
Hahn et al.

[11] Patent Number: 5,104,903
[45] Date of Patent: Apr. 14, 1992

[54] BEAD-FORM EXPANDABLE STYRENE POLYMERS HAVING A HIGH EXPANSION CAPACITY

[75] Inventors: Klaus Hahn, Kirchheim; Uwe Guhr, Gruenstadt; Hans Hintz, Ludwigshafen; Rolf Richter, Mannheim, all of Fed. Rep. of Germany

[73] Assignee: BASF Aktiengesellschaft, Ludwigshafen, Fed. Rep. of Germany

[21] Appl. No.: 532,740

[22] Filed: Jun. 4, 1990

[30] Foreign Application Priority Data

Jun. 28, 1989 [DE] Fed. Rep. of Germany ....... 3921148

[51] Int. Cl.$^5$ .............................................. C08J 9/20
[52] U.S. Cl. ........................................ 521/56; 521/60; 521/89; 521/98
[58] Field of Search ................. 521/60, 56, 89, 98

[56] References Cited

U.S. PATENT DOCUMENTS

| | | | |
|---|---|---|---|
| 4,513,105 | 4/1985 | Hahn et al. | 521/60 |
| 4,520,135 | 5/1985 | Hahn et al. | 521/60 |
| 4,525,484 | 6/1985 | Hahn et al. | 521/60 |

FOREIGN PATENT DOCUMENTS 106129 4/1984 European Pat. Off. .

Primary Examiner—Morton Foelak
Attorney, Agent, or Firm—Oblon, Spivak, McClelland, Maier & Neustadt

[57] ABSTRACT

Bead-form expandable styrene polymers containing a styrene polymer having a mean molecular weight (weight average) of less than $130 \cdot 10^3$ and a steep high-molecular-weight flank of the molecular-weight distribution curve, and 0.15 to 1.5 mol of a $C_3$- to $C_6$-hydrocarbon as blowing agent, and, if desired, customary additives in effective amounts, are distinguished by a particularly high expansion capacity.

11 Claims, 1 Drawing Sheet

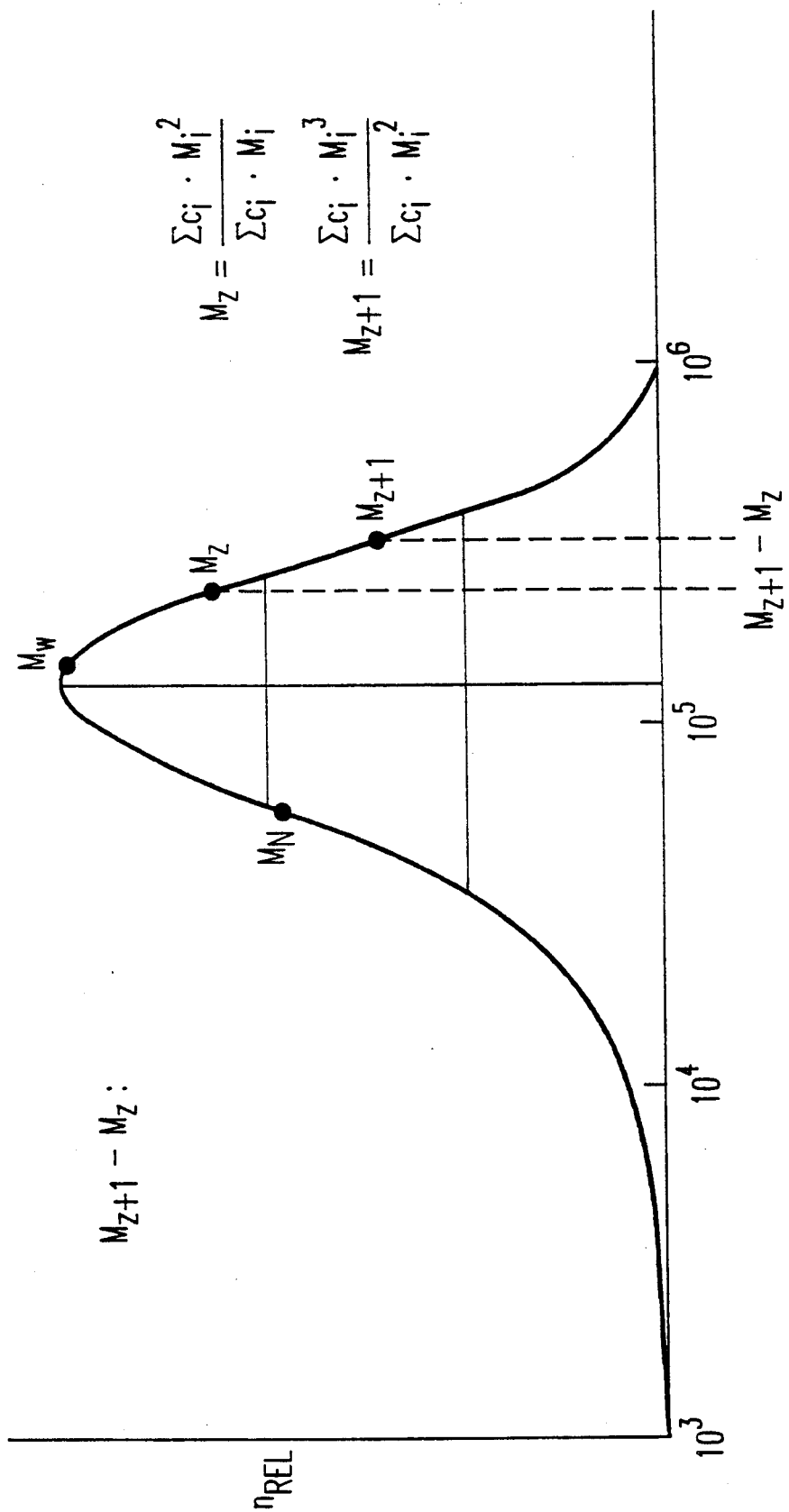

BEAD-FORM EXPANDABLE STYRENE POLYMERS HAVING A HIGH EXPANSION CAPACITY

The present invention relates to expandable styrene polymers which have a high expansion capacity and are distinguished by a high ratio between the expansion capacity and the amount of blowing agent.

EP-B 106,129 discloses an expandable polystyrene having improved expandability, where the polystyrene has a mean molecular weight $M_w$ (weight average) between 130,000 and 180,000 and where the high-molecular-weight flank of the molecular-weight distribution curve is so steep that the difference in the means $(M_{z+1}-M_z)$ is less than 150,000. According to the examples of this patent, expandable polystyrene of this type, which contains about 1 mole of pentane per kg of polystyrene, can be foamed at high throughput to prepare foam beads having a bulk density of 15 g/l.

It is an object of the present invention to develop an expandable polystyrene which has a significantly higher expansion capacity, i.e. which can be foamed using comparable amounts of blowing agent to give a significantly lower bulk density, or which allows comparable bulk densities to be produced with significantly lower amounts of blowing agent.

We have found, surprisingly, that this object is achieved if the styrene polymer has a mean molecular weight $M_w$ of greater than $60 \cdot 10^3$ and less than $130 \cdot 10^3$ and has a steep high-molecular-weight flank.

The drawing figure illustrates a typical molecular-weight distribution curve, obtained by GPC measurements, for the polymers in accord with the present invention.

The present invention therefore relates to bead-form expandable styrene polymers having an expansion capacity E of from 30 to 80, where E is the ratio of the bulk density of the expandable beads to the bulk density of the foam beads obtained by steam treatment (6 minutes, 120° C.), and containing a) a styrene polymer having a mean molecular weight $M_w$ (weight average), measured by the GPC method, of greater than $60 \cdot 10^3$ and less than $130 \cdot 10^3$ and a steep high-molecular-weight flank of the molecular-weight distribution curve, measured by the GPC method, the difference in the means $(M_{z+1}-M_z)$ being less than $150 \cdot 10^3$, b) 0.15–1.5 mol of a $C_3$- to $C_6$-hydrocarbon per kg of component a) as blowing agent, and, if desired, c) customary additives in effective amounts.

Surprisingly, the dimensional stability of the foam moldings produced from the novel expandable styrene polymers is not adversely affected.

As the principal component a), the novel products contain polystyrene and/or a styrene copolymer containing at least 50% by weight, preferably at least 80% by weight, of copolymerized polystyrene. Examples of suitable comonomers are α-methylstyrene, ring-halogenated styrenes, ring-alkylated styrenes, acrylonitrile, acrylates or methacrylates of alcohols having 1 to 8 carbon atoms, N-vinylcarbazole and maleic acid (anhydride). The polystyrene may advantageously contain a small amount of a crosslinking agent in copolymerized form, i.e. a compound having more than one, preferably 2, double bonds, such as divinylbenzene, butadiene or butanediol diacrylate. The crosslinking agent is generally used in an amount of from 0.005 to 0.05 mol %, based on styrene.

The styrene polymers according to the invention differ from those of the prior art through their molecular weight and their molecular-weight distribution. The molecular weight is determined by gel-permeation chromatography. The GPC method is described in detail in G. Glöckler, Polymercharakterisierung. Chromatographische Methoden, Volume 17, Hüthig-Verlag, Heidelberg 1982. According to the invention, the polystyrene has a mean molecular weight $M_w$ (weight average) of greater than $60 \cdot 10^3$ and less than $130 \cdot 10^3$, preferably of from $70 \cdot 10^3$ to $128 \cdot 10^3$, in particular $75 \cdot 10^3$ to $125 \cdot 10^3$. It is furthermore distinguished by its molecular-weight distribution, it being necessary for the high-molecular-weight flank of the molecular-weight distribution curve to be so steep that the difference in the means $(M_{z+1}-M_z)$ is less than $150 \cdot 10^3$, preferably less than $130 \cdot 10^3$ and in particular less than $120 \cdot 10^3$. The means mentioned are described and defined in H. G. Elias, Makromoleküle, Hüthig-Verlag 1971, pages 52 and 64. The figure shows a typical molecular-weight distribution curve obtained by GPC measurements, where the relative frequency $n_{rel}$ of the polymer chains of a certain molecular weight is plotted against the molecular weight. $M_w$ is the weight average and $M_n$ is the number average: $M_z$ and $M_{z+1}$ are further means which can be computed by the method of Elias and which lie on the high-molecular-weight flank of the curve. Their difference $(M_{z+1}-M_z)$ is a measure of the steepness of this part of the curve.

The expandable styrene polymers contain, as blowing agent, from 0.15 to 1.5 mol, preferably 0.3 to 1.2 mol and in particular 0.5 to 1.0 mol, of a $C_3$- to $C_6$-hydrocarbon, such as propane, butane, isobutane, n-pentane, i-pentane, neopentane and/or hexane. A commercially available pentane mixture is preferably used.

The polystyrene particles may also contain additives of other substances which impart certain properties to the expandable products. Examples which may be mentioned are flameproofing agents based on organic bromine or chlorine compounds, such as trisdibromopropyl phosphate, hexabromocyclododecane and chlorinated paraffin, and synergists for flameproofing agents, such as dicumyl peroxide and highly unstable organic peroxides; furthermore antistatic agents, stabilizers, dyes, lubricants, fillers and substances which have an antiadhesive effect during pre-foaming, such as zinc stearate, melamine/formaldehyde condensates or silica, and agents for shortening the demolding time during final foaming, for example glycerol esters or hydroxycarboxylates. Depending on the intended action, the additives may be homogeneously distributed in the particles or be present in the form of a surface coating.

The expandable styrene polymers are distinguished by a high expansion capacity E of from 30 to 80, preferably 40 to 80 and in particular 50 to 80, where E is ratio of the bulk density of the expandable beads to the bulk density of the foam beads obtained by steam treatment (6 minutes at 120° C.).

The expandable styrene polymers are also distinguished by the fact that the ratio of the expansion capacity E to the amount of blowing agent M (=moles of blowing agent per kg of styrene polymer) is from 30 to 80, preferably 40 to 80, in particular 50 to 75. The novel products thus contribute to environmental protection, since significantly smaller amounts of blowing agent are required than in the prior art in order to achieve the same density.

According to a preferred process, the blowing agent-containing polystyrene particles according to the invention are prepared by polymerization of styrene in aqueous suspension, the above-described blowing agents and, if desired, the additives being added before, during or after the polymerization. During the polymerization, advantageously at a styrene conversion of from 20 to 90%, more than 0.5% by weight and up to 3% of a customary, preferably bromine-free regulator having a chain-transfer constant K of from 0.1 to 50 are added.

The suspension polymerization of styrene is known per se. It is described in detail in Kunststoff-Handbuch, Volume V (Polystyrene) Carl Hanser-Verlag, pages 679 to 688. In this process, styrene is suspended in water and customary organic or inorganic suspension stabilizers are added, preferably in an amount of from 0.05 to 2% by weight, based on the suspension. The polymerization is generally carried out at from 80° to 130° C., preferably at from 100° to 120° C. The polymerization is initiated by organic polymerization initiators, for example peroxides or azo compounds, which decompose under the action of heat to form free radicals. They are employed in an amount of from 0.01 to 1% by weight, based on the monomers. The chain-transfer agents are generally added to the polymerization batch at a conversion of from 20 to 90%, preferably 40 to 60%. For the purposes of the invention, the conversion is the percentage of polymerized monomers, based on the total amount of monomers employed. It can be measured, for example, by terminating the polymerization after a certain time, for example by adding inhibitors, and determining the amount of non-polymerized monomers.

Chain-transfer agents having a transfer constant K (according to Vollmert, Grundriβ der Makromolekularen Chemie, Springer Verlag 1962, pages 52 and 71) of from 0.1 to 50, preferably 1 to 30, are used. The following are examples of suitable chain-transfer agents:

| | |
|---|---|
| n-dodecyl mercaptan | (K = 19) |
| tert.-dodecyl mercaptan | (K = 3) |
| n-butyl mercaptan | (K = 22) |
| tert.-butyl mercaptan | (K = 3.6) |
| pentaphenylethane | (K = 2.0) |
| dimeric α-methylstyrene | (K = 0.5) |

The content of styrene in the expandable styrene polymers should generally be low and is usually less than 0.2% by weight, preferably less than 0.1% by weight, in particular less than 0.08% by weight. In order to achieve this aim, it is expedient, when mercaptans are used as regulators, not to add these until during the polymerization at a conversion of from 20 to 90%.

The blowing agent-containing polystyrene particles according to the invention are in bead form and generally have a diameter of from 0.2 to 4 mm. They can be pre-foamed by customary methods, for example using steam, to give foam particles having a diameter of from 0.5 to 2 cm and a density of from 5 to 100 g·l$^{-1}$. It is apparent that the added chain-transfer agents considerably increase the throughput here.

The pre-foamed particles can then be foamed to completion by customary processes to give foam moldings having a density of from 5 to 100 g·l$^{-1}$.

The addition of chain-transfer agents affects the molecular weight and the molecular-weight distribution of the resultant polymers, and thus also their rheological properties, which are themselves responsible for the expandability of the blowing agent-containing polystyrene particles and the dimensional stability of the foam moldings produced therefrom. Thus, for example, a reduction in the melt extensibility results in better expandability, and a reduction in the reversible elongation at constant melt extensibility results in better dimensional stability. Both properties can be measured directly on the blowing agent-containing styrene polymer particles by a procedure in Prüfung hochpolymerer Werkstoffe, Carl Hanser Verlag, Vienna, 1977, page 422:

The polystyrene particles are melted by heating to 155° C. and degassed for 5 minutes to evaporate the blowing agent. A polymer strand having a length of 20 mm and a diameter of 5 mm is produced by extrusion. The sample is clamped in a tension apparatus in silicone oil at 150° C. It is then elongated at a tensile stress of 2·10$^4$ Pa to a length of 300 mm. The melt extensibility is derived from the ratio of tensile force to rate of elongation. After the tensile stress is removed, the sample shrinks again. The reversible elongation E is the natural logarithm of the ratio of initial length of the sample to the length of the sample after shrinkage.

The blowing agent-containing polystyrene particles according to the invention have a melt extensibility of less than 4.2·10$^6$ [Pas], preferably of from 1.5 to 3.0·10$^6$ [Pas], and a reversible elongation of less than 0.95, preferably of from 0.6 to 0.9, measured by the methods described. In the examples, parts and percentages are by weight.

EXAMPLE 1-9

1. Polymerization

In a pressure-tight stirred reactor, a mixture of 150 parts of water, 0.1 part of sodium pyrophosphate, 100 parts of styrene, 0.45 part of benzoyl peroxide, 0.15 part of tert.-butyl perbenzoate and the amount of pentane indicated in the table was heated to 90° C. with stirring.

After 2 hours at 90° C., 4 parts of a 10% strength aqueous solution of polyvinylpyrrolidone were added.

The mixture was then stirred for a further 2 hours at 90° C., subsequently for 2 hours at 100° C. and finally for 2 hours at 120° C. The chain-transfer agents indicated in the table were added after the time indicated in the table.

The bead polymer obtained having a mean particle diameter of 1.5 mm was isolated and dried.

2. The expandability was investigated using a screen (mesh width: 0.1-0.2 mm) measuring 1000×800×250 mm which was held in a metal frame in a sealed metal housing with steam inlet and steam extractor.

The steam at 120° C. flowed into the pre-foaming apparatus from below, passed through the wire mesh containing the products to be tested and escaped again through the steam extractor. Before commencement of the tests, the apparatus was first preheated for about 5 minutes. 100 g of the expandable bead polymer having a particle diameter of from 1.0 to 2.0 mm were subsequently distributed uniformly on the wire mesh, the apparatus was sealed, and the steam valve was opened. After 6 minutes, the steam valve was closed again, and the metal housing was opened. The bulk density of the pre-foamed material was subsequently determined.

The results obtained are shown in the table.

3. Molecular-weight measurement

The mean molecular weight and the molecular-weight distribution were determined by the GPC method. In this, a column combination was assembled which ensures best possible separation in both the low-molecular-weight and high-molecular-weight ranges.

The column combination comprises 5 consecutive columns, each with an individual length of L=300 and an internal diameter D=10 mm. The following silica columns were used:

| | |
|---|---|
| 1 × Si | 60 |
| 1 × Si | 100 |
| 1 × Si | 300 |
| 2 × Si | 1000 |

The packing material is LiChrospher and LiChrosorb from Merck (silica gels) having a grain size of 10 μm (exception Si 60=LiChrosorb).

The flow rate was 2.8 ml/min, and the solvent for polystyrene is tetrahydrofuran. 200 μl of a 0.5% strength solution were injected at room temperature. The detector is a dual detector type 61.00 differential refractometer from Knauer. A drop counter is used to ensure a uniform flow rate.

In order to convert the results obtained to the molecular weight, a calibration curve is produced in parallel from 12 closely distributed polystyrene samples of known molecular weight from Pressure Chemical Co.

In order to standardize the column combination used, the broad polystyrene sample no. 706 characterized by the National Bureau of Standards is measured. The following means were obtained for the molecular weight of this polystyrene sample:

| | |
|---|---|
| M = | 74,000 |
| $M_w$ = | 243,000 |
| $M_z$ = | 392,000 | molecular-weight distribution curve, measured by the GPC method, the difference in the means $(M_{z+1} - M_z)$ being less than $150 \times 10^3$; and (b) 0.15–1.5 mol of a $C_3$- to $C_6$-hydrocarbon per kg of said styrene polymer, as blowing agent.

2. The bead-form expandable styrene polymer according to claim 1, further comprising one or more additives selected from the group consisting of flameproofing agents, synergists for flameproofing agents, antistatic agents, stabilizers, dyes, lubricants, fillers, substances which have an anti-adhesive effect during pre-foaming, and agents for shortening the demolding time during final foaming.

3. The bead-form expandable styrene polymer according to claim 1, wherein said styrene polymer is a styrene copolymer containing at least 50% by weight of copolymerized styrene.

4. The bead-form expandable styrene according to claim 3, wherein said styrene is copolymerized with a comonomer selected from the group consisting of α-methylstyrene, ring-halogenated styrene, ring-alkylated styrene, acrylonitrile, acrylates or methacrylates of alcohols having 1 to 8 carbon atoms, N-vinylcarbazole, maleic acid and maleic anhydride.

5. The bead-form expandable styrene polymer according to claim 1, wherein said styrene polymer contains from 0.005 to 0.05 mol %, based on styrene, of a crosslinking agent, in copolymerized form.

6. The bead-form expandable styrene polymer according to claim 5, herein said crosslinking agent is selected from the group consisting of divinylbenzene, butadiene and butanediol diacrylate.

7. The bead-form expandable styrene polymer according to claim 1, wherein said styrene polymer has a mean molecular weight $M_w$ (weight average), measured by the GPC method, of from $70 \times 10^3$ to $127 \times 10^3$.

8. The bead-form expandable styrene polymer according to claim 7, wherein said styrene polymer has a mean molecular $M_w$ (weight average), measured by the GPC method, of from $75 \times 10^3$ to $125 \times 10^3$.

9. The bead-form expandable styrene-polymer according to claim 1, wherein said difference in the means $(M_{z+1} - M_z)$ is less than $130 \times 10^3$.

10. The bead-form expandable styrene polymer according to claim 9, wherein said difference in the means $(M_{z+1} - M_z)$ is less than $120 \times 10^3$.

11. The bead-form expandable styrene polymer according to claim 1, wherein the content of styrene is less than 0.2% by weight.

TABLE

| | Example | | | | | | | | |
|---|---|---|---|---|---|---|---|---|---|
| | 1 | 2 | 3 | 4 | 5 | 6 | 7 | 8* Comparison | 9* Comparison |
| Pentane [mol/kg of styrene] M | 0.8 | 0.8 | 1.3 | 1.3 | 1.3 | 1.3 | 1.3 | 1 | 1 |
| Chain-transfer agent tert.-dodecyl mercaptan [% by weight] | 0.7 | 1.0 | 0.7 | 1.0 | 1.5 | — | — | 0.3 | — |
| Chain-transfer agent dimeric α-methylstyrene [% by weight] | — | — | — | — | — | 1.0 | 2.0 | — | — |
| Point of addition [% conversion] | 45 | 50 | 50 | 50 | 50 | 0 | 0 | 55 | — |
| $M_w \cdot 10^3$ | 110 | 97 | 108 | 95 | 80 | 101 | 83 | 134 | 221 |
| $M_{z+1} - M_z \cdot 10^3$ | 131 | 111 | 129 | 103 | 101 | 121 | 110 | 133 | 163 |
| Expansion capacity E | 49 | 56 | 64 | 73 | 76 | 63 | 74 | 45 | 40 |
| E/M | 61 | 70 | 49 | 56 | 58 | 48 | 57 | 45 | 40 |

*in accordance with EP-B 106 129

We claim:

1. A bead-form expandable styrene polymer having an expansion capacity E of from 30 to 80, where E is the ratio of the bulk density of the expandable beads to the bulk density of the foam beads obtained by steam treatment (6 minutes, 120° C.), comprising:

(a) a styrene polymer having a mean molecular weight $M_w$ (weight average), measured by the GPC method, of greater than $60 \times 10^3$ to $128 \times 10^3$ and a steep high-molecular-weight flank of the